No. 811,986. PATENTED FEB. 6, 1906.
J. WILKINSON.
MARINE TURBINE.
APPLICATION FILED SEPT. 1, 1904.
2 SHEETS—SHEET 1.
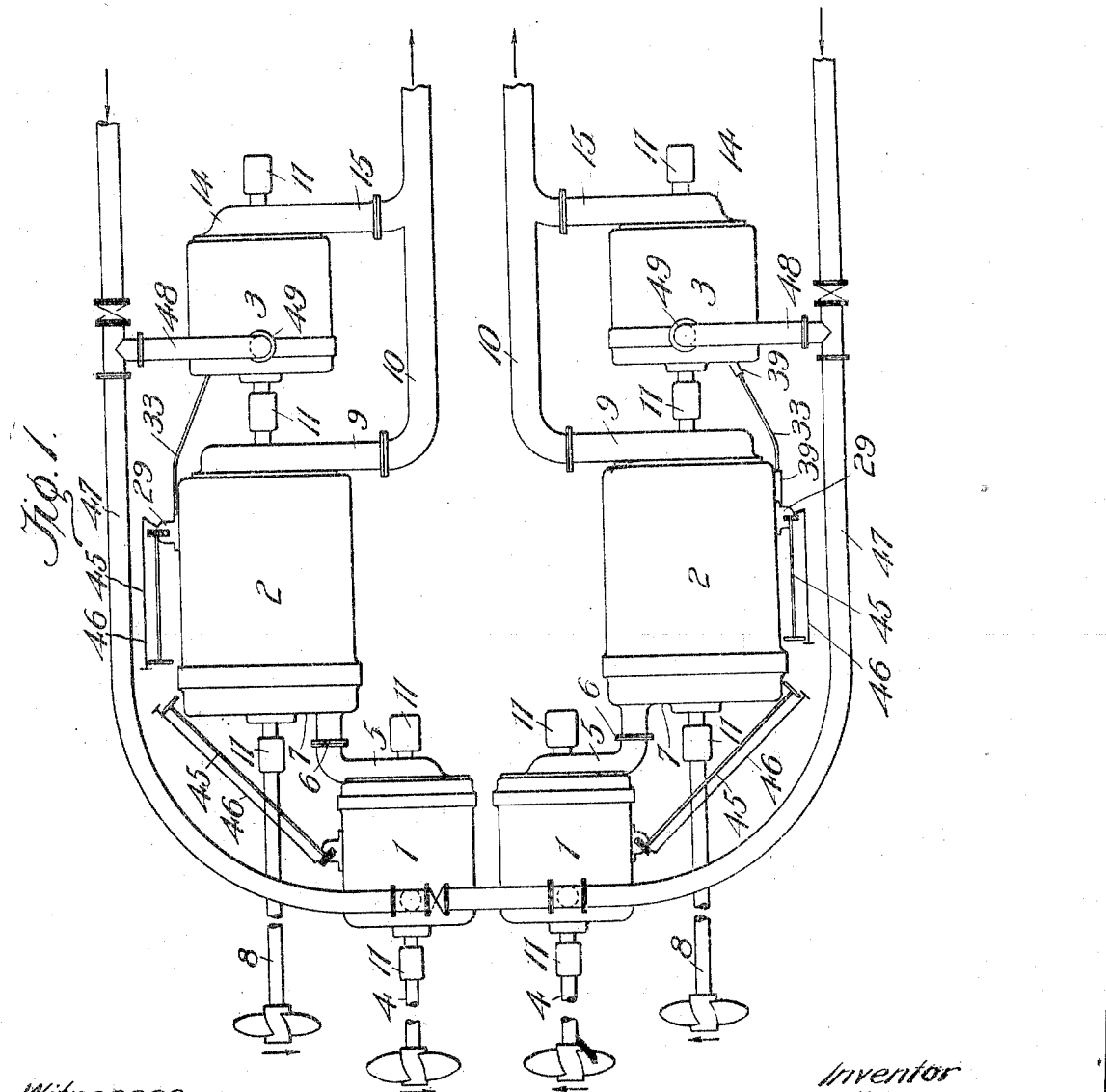
Witnesses
Edwin L. Bradford
Ralph Worsnell
Inventor
James Wilkinson
by Robt. A. Johnston Jr.
Attorney No. 811,986. PATENTED FEB. 6, 1906.
J. WILKINSON.
MARINE TURBINE.
APPLICATION FILED SEPT. 1, 1904.
2 SHEETS—SHEET 2.
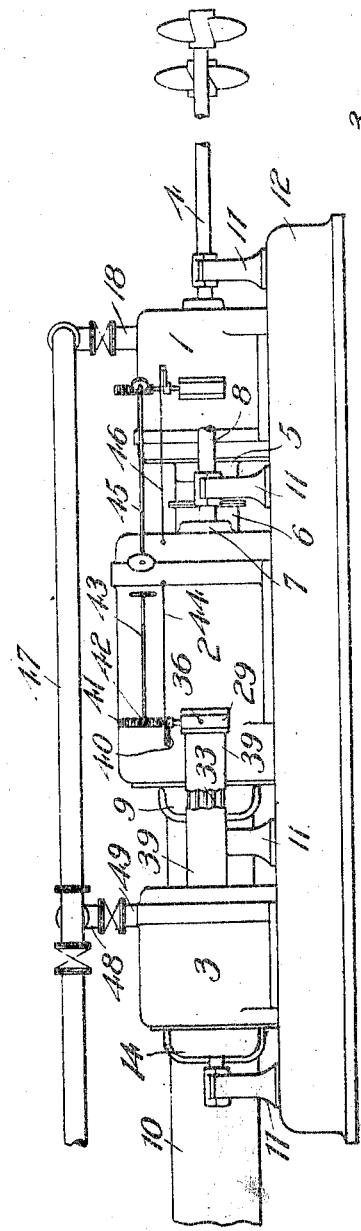
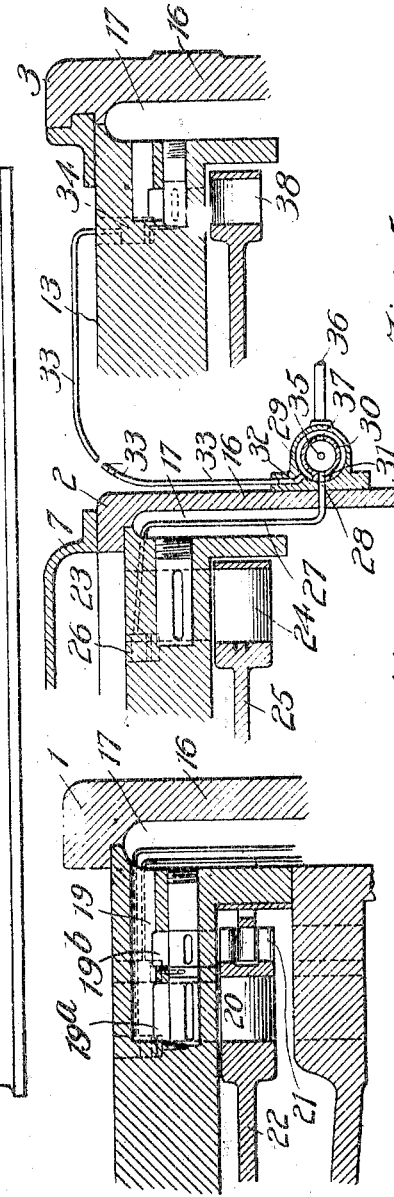
Witnesses
Edwin L. Bradford.
Ralph Wormelle
Inventor
James Wilkinson
by Robt. D. Johnston Jr.
Attorney

UNITED STATES PATENT OFFICE.

JAMES WILKINSON, OF BIRMINGHAM, ALABAMA, ASSIGNOR TO WILKINSON TURBINE COMPANY, A CORPORATION OF ALABAMA.

MARINE TURBINE.

No. 811,986.

Specification of Letters Patent.

Patented Feb. 8, 1906.

Application filed September 1, 1904. Serial No. 223,019.

*To all whom it may concern:*

Be it known that I, JAMES WILKINSON, a citizen of the United States, residing at Birmingham, in the county of Jefferson and State of Alabama, have invented new and useful Improvements in Marine Turbines, of which the following is a specification.

My invention relates to compound sets of elastic-fluid turbines particularly applicable to marine propulsion.

My invention has for its principal object to provide a set of turbines capable of operating with economy and high efficiency under the widely-varying conditions of speed and load encountered in marine propulsion. To this end I associate together two sets of turbines, each set comprising a high-pressure two-speed turbine, a low-pressure turbine adapted to operate in series therewith, and a high-pressure reversing-turbine mounted on the shaft of the low-pressure turbine, each set being thus adapted to drive two independent propeller-shafts.

It is a further object to improve the means for regulating a set of turbines so that the different driving effects desired may be obtained without loss in the economical operation of the motor fluid.

It is a further object to simplify the operation of the controller means for a set of turbines of the multiple-nozzle type and to provide a single controller mechanism for controlling the supply of motor fluid to two or more independent turbines of the series—here the low-pressure forward-driving and the reversing turbines.

These and other improvements in the construction and arrangement of parts constituting my present invention are hereinafter more fully described, reference being had to the accompanying drawings, wherein—

Figure 1 is a top plan view of a compound set of turbines. Fig. 2 is a side elevation of the same. Fig. 3 is a partial sectional view taken through one of the high-pressure two-speed turbines and illustrating the arrangement of buckets and the manner of supplying motor fluid to the working passages therein. Fig. 4 is a similar view through one of the low-pressure single-speed turbines, illustrating in cross-section the controller mechanism therefor, which also regulates the admission of motor fluid to a reversing-turbine, shown in partial sectional elevation in Fig. 5.

Similar reference-numerals refer to the same parts throughout the drawings.

I have illustrated my present invention in connection with two similarly-arranged sets of turbines, each set preferably comprising a high-pressure two-speed direct turbine 1, a low-pressure single-speed direct turbine 2, and an independent high-pressure reversing-turbine 3. The high-pressure two-speed turbines 1 may be such as are more fully described in Letters Patent No. 788,006, heretofore issued to me relating to a compound marine turbine on which my present invention is an improvement, each of them comprising two independent groups of any desired number of working passages formed by succeeding nozzles and interposed rows of rotating buckets which act to drive their propeller-shafts 4 at full or cruising speeds. The exhaust-head 5 of each turbine 1 communicates by a conduit 6 with the supply-head 7 for a turbine 2, each of which drives a propeller-shaft 8. The exhaust-heads 9 of the turbines 2 communicate with exhaust-conduits 10, leading to the atmosphere or to a condenser, as may be desired. Each of the high-pressure reversing-turbines 3 is connected to the shafts 8 and preferably disposed to the rear of turbine 2. These several turbines, as well as bearings 11 for their several propeller-shafts, are preferably mounted upon a common bed-plate 12. Each reversing-turbine 3 comprises a supply-head 13 and an exhaust-head 14, which communicates with the common exhaust-conduits 10 through pipes 15. Between the supply and exhaust heads of these and the several other turbines I dispose diaphragm partitions, which subdivide their interiors into a plurality of stages or wheel-compartments and form the inner casing of the turbines, which are surrounded by shells 16. Annular chambers 17 are formed between the shells and turbine-casings. The high pressure is admitted through a port 18 in the shell to this chamber in turbines 1, from which it flows through passages 19 to the valve-controlled supply-nozzles 19ª and 19ᵇ, respectively, adapted to discharge it against buckets 20 and 21 on bucket-wheel 22. Any suitable governing mechanism, such as that constituting the subject-matter of my said patent, may be used to open and close the nozzles of turbines 1, being preferably adapted to control either group of full or cruising speed nozzles independently or to open and close them together and admit motor fluid to all the working passages of the turbines.

The exhaust fluid from turbines 1 enters chambers 23 in the supply-heads 7 of turbines 2, from which it flows through valve-controlled nozzles to the working passages of the turbines, being directed against the forward-driving buckets 24 on the bucket-wheels 25. I use fluid-actuated motors 26 to open and close these nozzles, the actuating fluid being conducted to the several motors by pipes 27, leading through the head and chamber 17 and shell 16. These pipes register with a row of ports 28 in a controller-casing 29, such as is described more fully in said patent, a rotatable valve-shell 30 being mounted therein and having a row of ports 31, which register with the pipes 27 or with a row of ports 32 in the casing 29, which connect with pipes 33, leading to the fluid-motors 34 in the head 13 of the adjacent reversing-turbine. A piston 35 in shell 30 acts as a valve to admit the fluid-pressure supplied to casing 29 through pipe 36 and admitted to the interior of the shell by a port 37 to one or more of the ports 31. When pressure is admitted to a controller-pipe, all the motors coupled up therewith will move the valves which they operate to close the nozzles under their control. I therefore form the shell 30 so that it admits pressure to one of the groups of passages 28 or 32, while controlling the admission or exhausting of pressure through ports 31 to the other row of pipes. In this manner when turbines 2 are operating the controller mechanism will cut off all motor fluid from admission to turbines 3, where it would act against the buckets 38 to reverse shafts 8, and, vice versa, when turbines 3 are operating the valve-controlled nozzles through which the exhaust from turbines 1 enters turbines 2 will be closed. Since turbines 1 exhaust through these nozzles, and since turbines 2 are supplied through them, it follows that when all are closed these turbines will be cut out of service, the flow of motor fluid through the one being stopped and the admission of motor fluid to the other being interrupted. It follows also that by varying the number of these nozzles held open the coöperation of these turbines may be controlled, so that they drive their respective shafts with varying powers or velocities. Hence a single mechanism controls not only the operation of a forward and a reversing turbine, but also the coöperation of the whole set of turbines. This feature of my present invention I claim as broadly novel and without limitation to the specific construction of the turbines or their governing means.

The shell 30 is rotated by a crank 40, and the piston-valve 35 is actuated by a rack 41 and pinion 42. Operating-rods 43 and 44 for the piston and shell, respectively, lead to a point from which the controller mechanism for the adjacent turbine 1, which may have similar operating devices 45 and 46, can be manipulated.

Motor-fluid pressure is supplied to ports 18 of turbines 1 through pipe 47, which has branches 48 leading to the supply-ports 49 for the reversing-turbines. These latter turbines 3 may, if desired, be provided with stage-valves, so that when the steam-supply is cut off their several wheel-compartments may be exposed to the atmosphere through drain-pipes leading from the bottom of said compartments for draining out all water of condensation accumulating therein, or, when the exhaust-pipes and condenser arrangements are such as to permit the draining of these turbines these stage-valves may be dispensed with, as when the condenser and exhaust pipes are disposed below the level of the turbine-wheels.

The propellers of the two sets of turbines normally rotate in opposite directions.

The independent control of each of the turbines enables me to produce varying driving effects, both as to speed and power, and also to operate them in opposition to each other to assist in steering the vessel.

Having thus described my invention, what I claim as new, and desire to protect by Letters Patent, is—

1. In a set of marine turbines, a high-pressure, two-speed, forward-driving turbine, and a low-pressure turbine operating in series therewith, independent shafts for said turbines, and a reversing-turbine connected to one of said shafts.

2. In a set of marine turbines, a high-pressure multicellular turbine having full and cruising speed working passages, a shaft therefor, a turbine adapted to operate in series with said high-pressure turbine, a shaft therefor, and a high-pressure reversing-turbine connected to one of said shafts.

3. In a set of marine turbines, a high-pressure turbine having working passages for driving a shaft at full and cruising speeds, a turbine connected up in series therewith, a separate shaft for said latter turbine, and an independent reversing-turbine connected to said latter shaft.

4. The combination with a forward-driving turbine and a reversing-turbine, of one or more valve-controlled nozzle-passages for each turbine, and a common controller mechanism for regulating the admission of motor fluid to said turbines.

5. The combination with a forward-driving turbine having a plurality of admission-nozzles, and a reversing-turbine having a plurality of admission-nozzles, of a fluid-pressure-controller mechanism adapted to control the admission of motor fluid to one of said turbines while cutting said other turbine out of service.

6. The combination in a set of turbines, of a forward-driving turbine, a reversing-turbine, motor-fluid-admission passages for each of said turbines, fluid-pressure-actuated means to open and close said passages, and a controller mechanism having conduits leading to the said fluid-actuated means of both turbines, said mechanism being adapted to close the admission-passages for one turbine and to control the opening of the admission-passages for the other.

7. In a set of marine turbines, the combination of two forward-driving turbines operating in series and connected to different shafts, and a reversing-turbine, with a controller means adapted to control the operation of the set of turbines by regulating the flow of motor fluid between the turbines connected in series and the admission of motor fluid to the reversing-turbines.

8. The combination of a forward-driving and a reversing-turbine both connected to a common shaft, with a common controller mechanism comprising fluid-actuated means to vary the admission of motor fluid to said turbines, a fluid-pressure-controller chamber, conduits leading therefrom to said several fluid-actuated means, and valve means operating to admit different fluid-pressures to said conduits to control the operation of said means and cut one of said turbines out of service, and to control the admission of motor fluid to the active turbine.

9. In a fluid-pressure-controller mechanism for a set of turbines, a plurality of fluid-pressure-admission nozzles for each turbine, fluid-actuated means to open and close said nozzles, conduits to connect said means with a controller-chamber, and valve means in said chamber adapted to control the admission of motor fluid to one of said turbines while cutting it off from the other, substantially as described.

10. In a fluid-pressure-controller mechanism for two independent turbines, motor-fluid-supply passages for said turbines, fluid-pressure-actuated valves to open and close said passages, conduits for conducting controller fluid-pressure to the valves of said turbines, and a controller-valve means to open said conduits to a high or low pressure to cause the valves which they control to open or close.

11. The combination of a turbine, and a fluid-pressure-controller means therefor, with a reversing-turbine, fluid-actuated valves therefor, and conduits leading from said controller means to said valves, said means being adapted to control the valves of said reversing-turbine in one operating position, when it cuts off the supply of fluid-pressure to said first-mentioned turbine.

12. In a set of marine turbines, a shaft, a forward-driving and a reversing-turbine connected to said shaft, a plurality of supply-valves and nozzles for each turbine, and a common controller means for the supply-valves of both turbines.

In testimony whereof I have hereunto set my hand in presence of two subscribing witnesses.

JAMES WILKINSON.

Witnesses:
NOMIE WELSH,
H. M. HARTON.